US006735401B2

United States Patent
Kajiwara et al.

(10) Patent No.: US 6,735,401 B2
(45) Date of Patent: May 11, 2004

(54) IMAGE FORMING APPARATUS HAVING TEST PATTERN TRANSFER PREVENTION CONTROL

(75) Inventors: Tadayuki Kajiwara, Chikushino (JP); Jun'ichi Tanizaki, Fukuoka (JP); Masaya Shimada, Onojo (JP)

(73) Assignee: Matsushita Electric Industrial Co., LTD, Osaka (JP)

( * ) Notice: Subject to any disclaimer, the term of this patent is extended or adjusted under 35 U.S.C. 154(b) by 0 days.

(21) Appl. No.: 09/810,470

(22) Filed: Mar. 19, 2001

(65) Prior Publication Data

US 2001/0031148 A1 Oct. 18, 2001

(30) Foreign Application Priority Data

Mar. 24, 2000 (JP) ........................................ 2000-084314

(51) Int. Cl.[7] .............................................. G03G 15/00
(52) U.S. Cl. ........................... 399/49; 399/302; 399/318
(58) Field of Search ........................... 399/49, 72, 301, 399/302, 299, 318, 308; 347/116

(56) References Cited

U.S. PATENT DOCUMENTS 5,822,648 A * 10/1998 Mohri ........................ 399/302
6,038,423 A * 3/2000 Tagawa et al. ............. 399/162
6,167,230 A * 12/2000 Kimura et al. .............. 399/315
6,188,418 B1 * 2/2001 Hata ........................... 347/116
6,278,857 B1 * 8/2001 Monji et al. .................. 318/85
6,285,849 B1 * 9/2001 Shimada et al. ............ 399/301
6,334,039 B1 * 12/2001 Yoshinaga et al. .......... 399/298

FOREIGN PATENT DOCUMENTS

JP                10104970 A  *   4/1998  ........... G03G/15/16

* cited by examiner

*Primary Examiner*—Robert Beatty
(74) *Attorney, Agent, or Firm*—Stevens, Davis, Miller & Mosher, LLP

(57) ABSTRACT

In a toner image forming apparatus, a contact member for pressing a work piece at a pressing position against a toner image on a movable transfer member so that the toner image is transferred from the transfer member onto the work piece is pressed against the transfer member while a test pattern toner image which is prevented from being transferred onto the work piece moves from a transfer position at which the toner image and the test pattern toner image are transferred onto the transfer member and a detecting position at which the test pattern toner image is detected to obtain a difference between the test pattern toner image on the transfer member and a desired test pattern image.

21 Claims, 12 Drawing Sheets

REGISTER PATTERN

IMAGE FORMING APPARATUS HAVING TEST PATTERN TRANSFER PREVENTION CONTROL

BACKGROUND OF THE INVENTION AND RELATED ART STATEMENT

The present invention relates to an apparatus for forming a toner image corresponding to a desirable image to be printed on a work piece, more particularly, an apparatus in which a control for forming a toner image is modified in accordance with a difference between a detected actually formed test pattern toner image which is not transferred to the work piece and a desired test pattern image, so that a difference between the toner image to be formed and the desirable image is decreased, that is, a control manner for decreasing the difference between the detected actually formed test pattern toner image and the desired test pattern image is incorporated into the control for forming the toner image.

In a prior art toner image forming apparatus, an actually formed test pattern toner image which is not transferred to a work piece is detected, but a difference between the detected actually formed test pattern toner image and a desired test pattern toner image does not correspond correctly to a difference between an actually formed toner image to be formed and a desirable image to be printed.

OBJECT AND SUMMARY OF THE INVENTION

An object of the present invention is to provide an apparatus for forming a toner image, in which a difference between a desired test pattern image and an actually formed test pattern toner image which is not transferred to a work piece and detected to determine a control manner for decreasing the difference corresponds correctly to a difference between an actually formed toner image to be formed and a desirable image to be printed.

In a toner image forming apparatus comprising, an image forming device for forming thereon a toner image corresponding to a desired image to be printed on a work piece, and a test pattern toner image which is prevented from being printed on the work piece and corresponds to a desired test pattern image, a movable transfer member for holding thereon the toner image and test pattern toner image, facing to the image forming device to transfer the toner image and test pattern toner image from the image forming device onto the transfer member at a transfer position, a contact member for pressing the work piece against the toner image on the transfer member at a pressing position so that the toner image is transferred from the transfer member onto the work piece by the contact member, a test pattern toner image detector for detecting the test pattern toner image on the transfer member at a detecting position so that a difference between the test pattern toner image on the transfer member and the desired test pattern image is obtained, and a controller for controlling a formation of the toner image on the image forming device with the substantially same control manner as a control manner for decreasing the difference between the test pattern toner image on the transfer member and the desired test pattern image, so that a difference between the toner image and the desired image is decreased, the contact member is pressed against the transfer member while the test pattern toner image on the transfer member moves from the transfer position to the detecting position.

Since the contact member is pressed against the transfer member while the test pattern toner image on the transfer member moves from the transfer position to the detecting position, the test pattern toner image is detected by the test pattern toner image detector in the substantially same condition of the transfer member as a condition of the transfer member in which the toner image moves from the transfer position to the detecting position, so that the difference between the desired test pattern image and the actually formed test pattern toner image corresponds correctly or is equal to the difference between the actually formed toner image and the desirable image.

The contact member is pressed against the transfer member while the toner image on the transfer member moves from the transfer position to the detecting position. A pressing force for pressing the contact member against the transfer member while the test pattern toner image on the transfer member moves from the transfer position to the detecting position may be substantially equal to a pressing force of the contact member for pressing the work piece against the toner image on the transfer member. The pressing force of the contact member for pressing the work piece against the toner image on the transfer member may be substantially equal to a pressing force for pressing the contact member against the transfer member while the toner image on the transfer member moves from the transfer position to the detecting position. The contact member prevents the work piece from being pressed against the test pattern toner image on the transfer member so that the test pattern toner image is prevented from being transferred from the transfer member onto the work piece at the pressing position. The work piece may be prevented from being supplied onto the contact member or to the pressing position when the test pattern toner image on the transfer member passes the pressing position, and/or the contact member is prevented from being pressed against the transfer member to prevent the test pattern toner image from being transferred from the transfer member onto the contact member when the test pattern toner image on the transfer member passes the pressing position. The contact member may be pressed against the transfer member also after the test pattern toner image on the transfer member passes the detecting position. The contact member may be prevented from being pressed against the transfer member before the test pattern toner image on the transfer member reaches the pressing position.

It is preferable for increasing a length of the test pattern toner image to be detected in a preferable condition of the transfer member that a length between the transfer position and the detecting position is smaller than a length between the detecting position and the pressing position, along a movement course of the test pattern toner image on the movable transfer member. The length of the test pattern toner image may be smaller than a length between the detecting position and the pressing position, along the movement course of the test pattern toner image on the movable transfer member.

When the image forming device forms a plurality of the test pattern toner images corresponding respectively to the desired test pattern images, and the test pattern toner image detector detects the test pattern toner images on the transfer member at the detecting position so that the differences between the test pattern toner images on the transfer member and the desired test pattern images are obtained, the controller controls a formation of the toner image on the image forming device in the same manner as a manner for decreasing the differences regarding the test pattern toner images, so that a difference between the toner image and the desired image is decreased, and the contact member is pressed against the transfer member while each of the test pattern toner images on the transfer member moves from the transfer position to the detecting position. A length of a combination of the test pattern toner images may be larger than the length between the detecting position and the pressing position, along the movement course of the test pattern toner image on the movable transfer member.

The contact member is pressed against the transfer member when the test pattern toner image is transferred onto the transfer member at the transfer position. The contact member is pressed against the transfer member when the test pattern toner image on the transfer member is detected at the detecting position.

The difference between the test pattern toner image on the transfer member and the desired test pattern image is a difference in at least one of width, length, attitude, size, shape and position therebetween, and the difference between the toner image and the desired image is a difference in the at least one of width, length, attitude, size, shape and position therebetween.

When the image forming device includes at least two image forming drums for forming thereon respective parts of the toner image corresponding to respective parts of the desired toner image and respective parts of the test pattern toner image corresponding to respective parts of the desired test pattern image, the controller controls formations of the parts of the toner image on the respective image forming drums, the difference between the test pattern toner image on the transfer member and the desired test pattern image is a difference between a positional relationship in, for example, distance, attitude or the like between the parts of the test pattern toner image and a positional relationship in, for example, distance, attitude or the like between the parts of the desired test pattern image corresponding to the parts of the test pattern toner image, and the difference between the toner image and the desired image is a difference between a positional relationship in, for example, distance, attitude or the like between the parts of the toner image and a positional relationship in, for example, distance, attitude or the like between the parts of the desired image corresponding to the parts of the toner image.

The contact member may be continuously pressed against the transfer member or kept being pressed against the transfer member while the test pattern toner image on the transfer member exists between the transfer position and the detecting position.

When the image forming device has a photo-sensitive drum for forming thereon latent images of the toner image and test pattern toner image to be developed with toner, and a light beam emitter for emitting a light beam onto the photo-sensitive drum to form the latent images, the control manner for decreasing the difference between the test pattern toner image on the transfer member and the desired test pattern image may be a control manner for adjusting at least one of a positioning of the emitted light beam on the photo-sensitive drum and a timing of emitting the light beam onto the photo-sensitive drum rotated synchronously with a movement of the transfer member so that the difference between the test pattern toner image on the transfer member and the desired test pattern image is decreased.

The control manner for decreasing the difference between the test pattern toner image and the desired test pattern image may be modified to be appropriately applied to or incorporated into the controlling the formation of the toner image, in accordance with a difference in, for example, transfer member moving speed, rigidity of transfer belt and/or pressing roller, thermal expansion of transfer belt and/or pressing roller, thermal expansion of distance between photo-sensitive drums, thermal expansion of distance between transfer member supporting rollers, or the like, between a condition in which the test pattern toner image is formed and detected and a condition in which the toner image is formed.

DETAILED DESCRIPTION OF PREFERRED EMBODIMENTS

Figure 1:
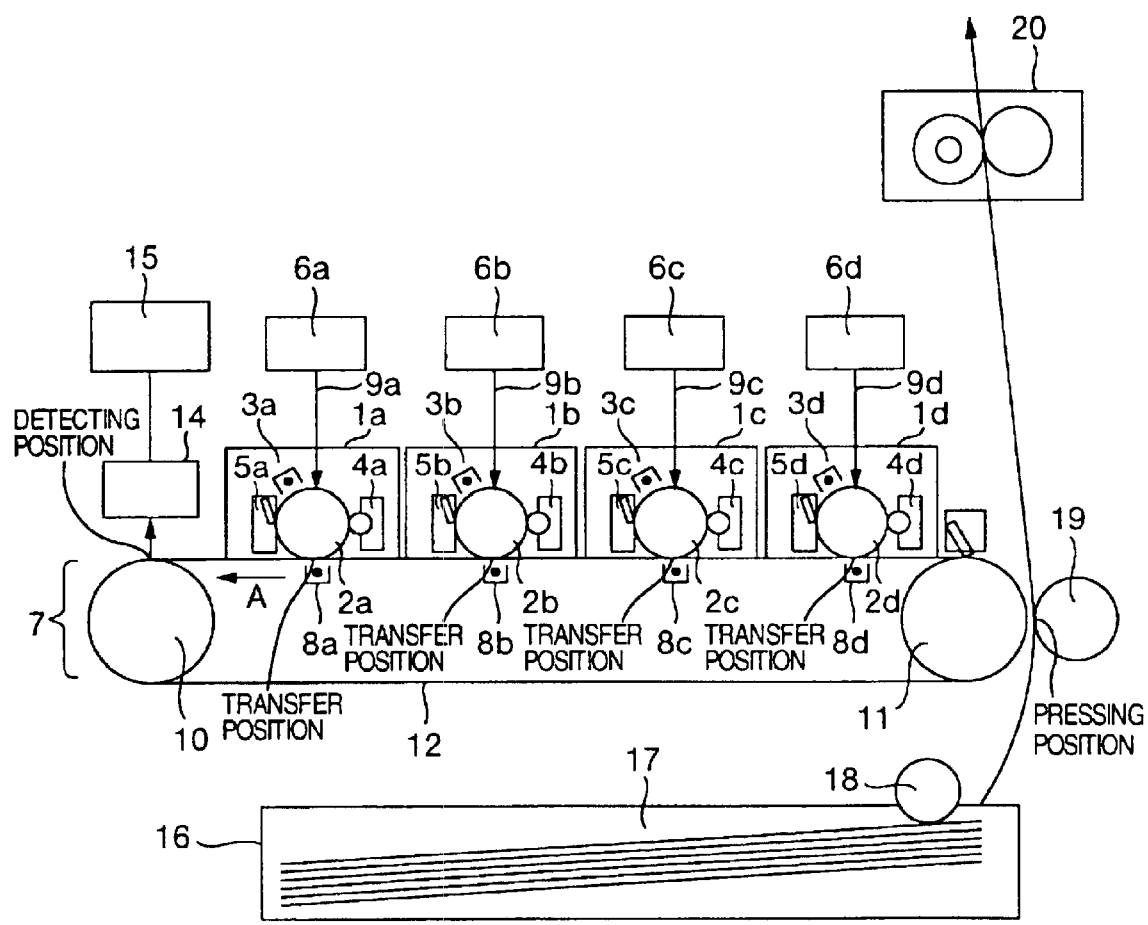
FIG. 1 is a schematic view showing a toner image forming apparatus of the invention.

A multi-color toner image forming apparatus as shown in FIG. 1 has four toner image forming stations 1a, 1b, 1c and 1d as the claimed image forming device for black, yellow, magenta and cyan toner images including respective photo-sensitive drums 2a, 2b, 2c and 2d as toner image carriers, electrifiers 3a, 3b, 3c and 3d for electrifying constantly photo-sensitive peripheral surfaces of the photo-sensitive drums 2a, 2b, 2c and 2d, developing devices 4a, 4b, 4c and 4b for developing respective latent images formed on the respective photo-sensitive peripheral surfaces with black (K) toner, yellow (Y) toner, magenta (M) toner and cyan (C) toner so that the toner images are formed, cleaning devices 5a, 5b, 5c and 5b for removing remainder of the toners from the photo-sensitive peripheral surfaces before electrifying the photo-sensitive peripheral surfaces after the toner images are transferred from the photo-sensitive drums 2a, 2b, 2c and 2d, light beam emitters 6a, 6b, 6c and 6s for emitting respective light beams onto the photo-sensitive peripheral surfaces to electrically discharge at least partially the photo-sensitive peripheral surfaces so that the latent images for the black, yellow, magenta and cyan toner images are formed on the respective photo-sensitive peripheral surfaces, and toner drawing devices 8a, 8b, 8c and 8d electrified to draw the toner images at a transfer position from the photo-sensitive drums 2a, 2b, 2c and 2d onto an endless intermediate belt 12 as the claimed transfer member which is supported and driven by a drive roller 10 in a direction denoted by an arrow A and is supported by a rotatable roller 12, so that a multi-color toner image is formed on the endless intermediate belt 12 by the black, yellow, magenta and cyan toner images.

The multi-color toner image for a desired image to be printed on a work piece 17 supplied from a container 16 by a supply roller 18 to a pressing position between the roller 12 and a pressing roller 19 as the claimed contact member is transferred from the intermediate belt 12 onto the work piece 17 by pressing the work piece 17 against the multi-color toner image on the intermediate belt 12 at the pressing position by the pressing roller 19. The multi-color toner image is fixed to the work piece 17 by heating the multi-color toner image by a heater 20 so that the desired image is printed on the work piece 17.

Figure 2:
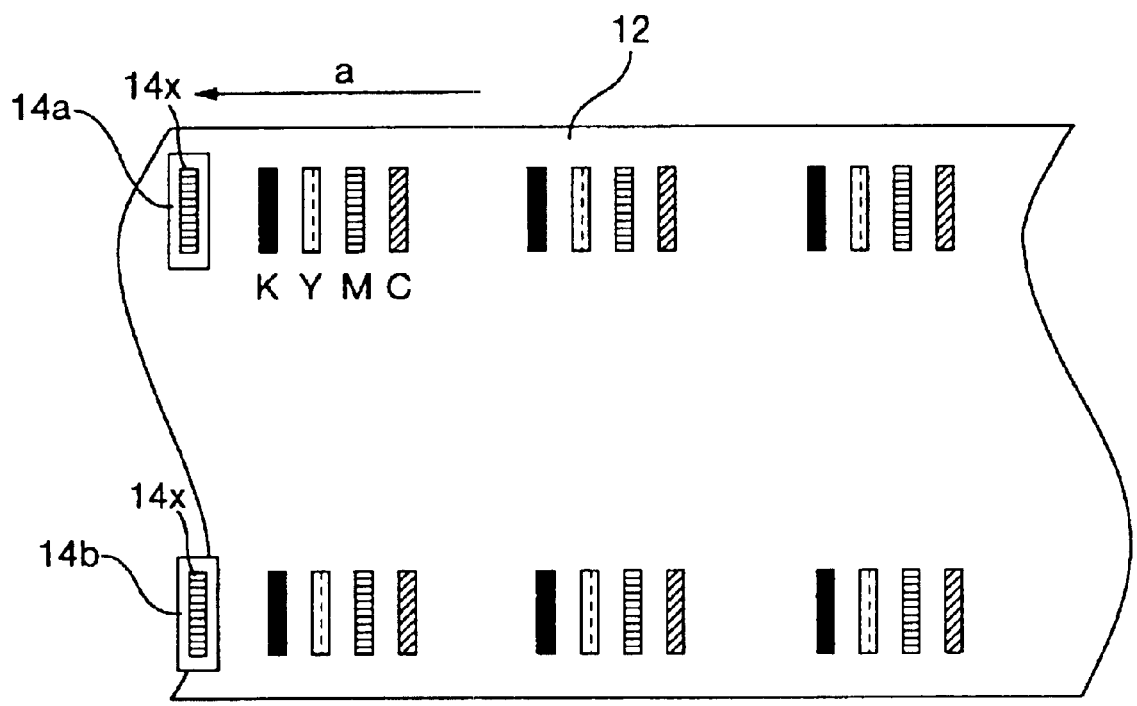
FIG. 2 is a schematic view showing a detection of an actually formed test pattern toner image.

A test pattern toner image for a desired predetermined test pattern image includes K (black) register or test pattern toner image for K (black) desired predetermined test pattern image, Y (yellow) register or test pattern toner image for Y (yellow) desired predetermined test pattern image, M (magenta) register or test pattern toner image for M (magenta) desired predetermined test pattern image and C (cyan) register or test pattern toner image for C (cyan) desired predetermined test pattern image formed respectively by the toner image forming stations 1a, 1b, 1c and 1d, and is formed on the intermediate belt 12 as shown in FIG. 2. The K, Y, M and C register or test pattern toner images correspond to the claimed parts of the test pattern toner image. Test pattern toner image detectors 14a and 14b including detecting pixels 14x as the claimed test pattern toner image detector detect the register pattern toner images at a detecting position so that a difference in at least one of width, length, attitude, size, shape and position between the test pattern toner image and the desired predetermined test pattern image as shown in FIGS. 19a–19e is obtained. The difference between the test pattern toner image and the desired predetermined test pattern image can be decreased by adjusting a timing of emitting the light beam onto at least one of the photo-sensitive drums 2a, 2b, 2c and 2d and/or positioning of the emitted light beam on at least one of the photo-sensitive surfaces of the photo-sensitive drums 2a, 2b, 2c and 2d. A control manner for adjusting the timing(s) of emitting the light beam(s) onto the photo-sensitive drum(s) 2a, 2b, 2c and/or 2d and/or the positioning of the emitted light beam(s) on the photo-sensitive surface(s) of the photo-sensitive drum(s) 2a, 2b, 2c and/or 2d for decreasing or which can decrease the difference obtained when the register or test pattern toner image is formed, detected and compared with the desired predetermined test pattern image is applied, utilized or incorporated to the positioning and/or timing control for emitting the light beam(s) onto the photo-sensitive drum(s) 2a, 2b, 2c and/or 2d when a toner image corresponding to a desirable image be printed is formed by the photo-sensitive drum(s) 2a, 2b, 2c and/or 2d, so that the toner image is correctly formed relative to the desirable image with a decreased difference therebetween similar or equal to the decreased difference between the test pattern toner image and the desired predetermined test pattern image. By the positioning control of the emitting the light beam(s), width, length, attitude, size, shape and position of the test pattern image and the toner image can be adjusted or corrected, and by the timing control of the emitting the light beam(s), the position of the test pattern image and the toner image in the movable direction of the intermediate belt 12 or the rotational direction of the photo-sensitive drum(s) 2a, 2b, 2c and/or 2d and a positional relationship among the test pattern images and toner images respectively formed by the photo-sensitive drum(s) 2a, 2b, 2c and/or 2d in the movable direction of the intermediate belt 12 or the rotational direction of the photo-sensitive drum(s) 2a, 2b, 2c and/or 2d can be adjusted or corrected. The control manner for adjusting the timing(s) of emitting the light beam(s) onto the photo-sensitive drum(s) 2a, 2b, 2c and/or 2d and/or the positioning of the emitted light beam(s) on the photo-sensitive surface(s) of the photo-sensitive drum(s) 2a, 2b, 2c and/or 2d for decreasing or which can decrease the difference obtained when the register or test pattern toner image is formed, may be imaginarily determined and/or experimentally inspected before being applied to the positioning and/or timing control for emitting the light beam(s) onto the photo-sensitive drum(s) 2a, 2b, 2c and/or 2d when the toner image is formed.

Figure 3:
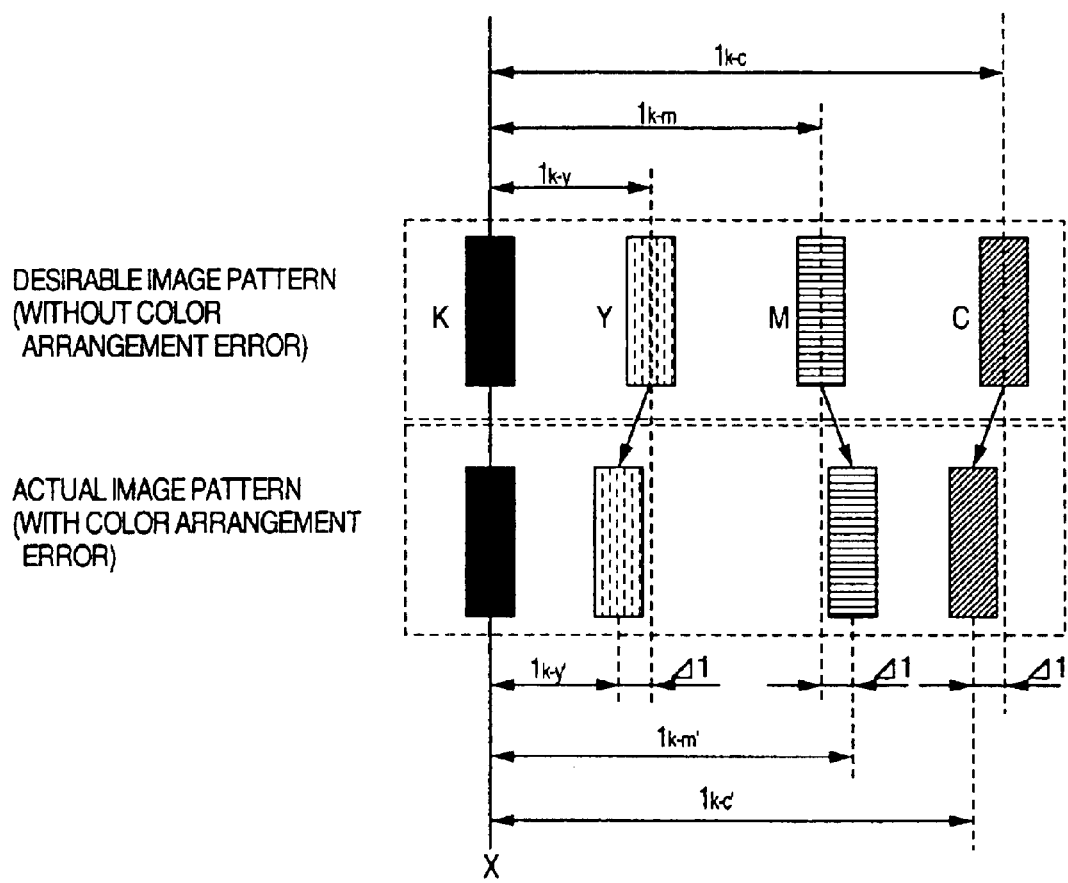
FIG. 3 is a schematic view showing a positional relationship among register or test pattern toner images of respective colors as parts of the claimed test pattern toner image.
Figure 4:
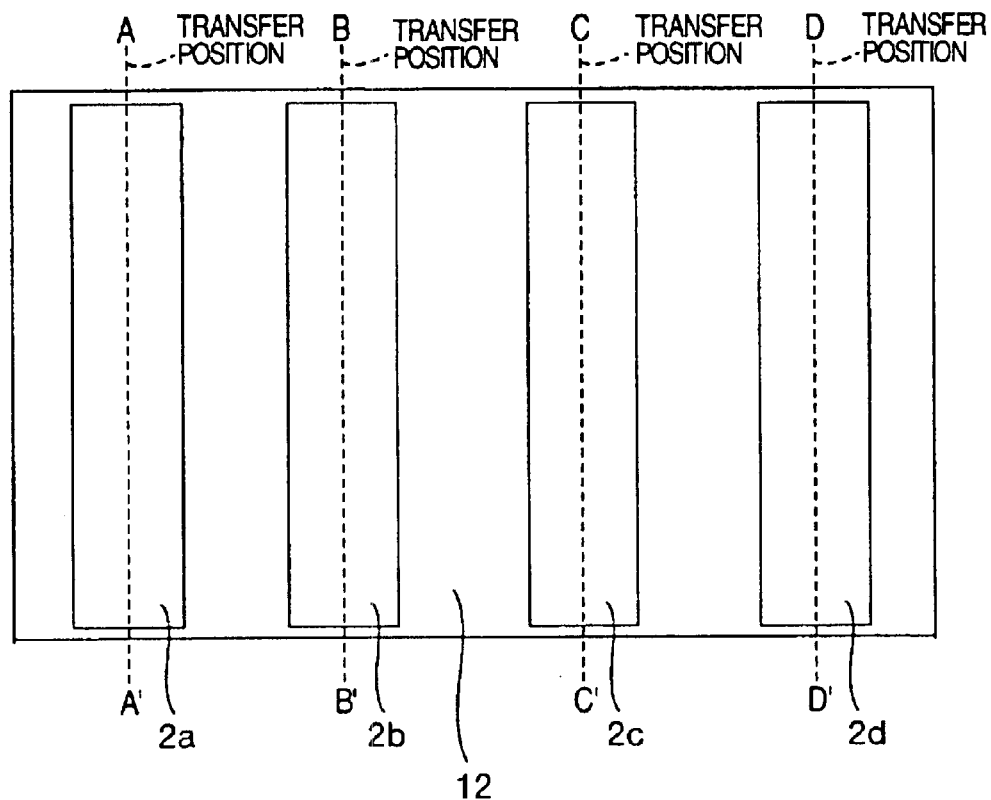
FIG. 4 is a schematic view showing a positional relationship among photo-sensitive drums for respective colors.
Figure 5:
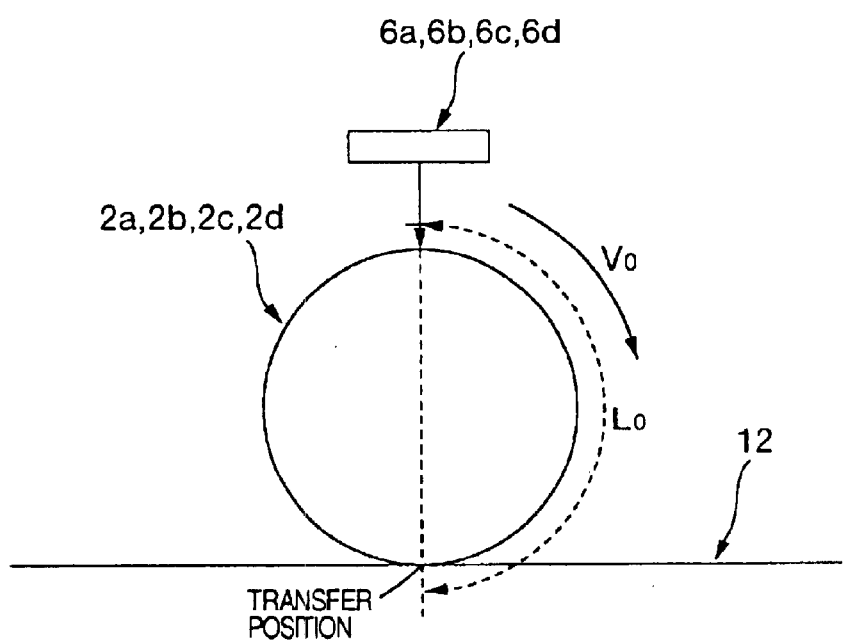
FIG. 5 is a schematic view showing a positional relationship between a photo-sensitive drum and an intermediate belt.
Figure 6:
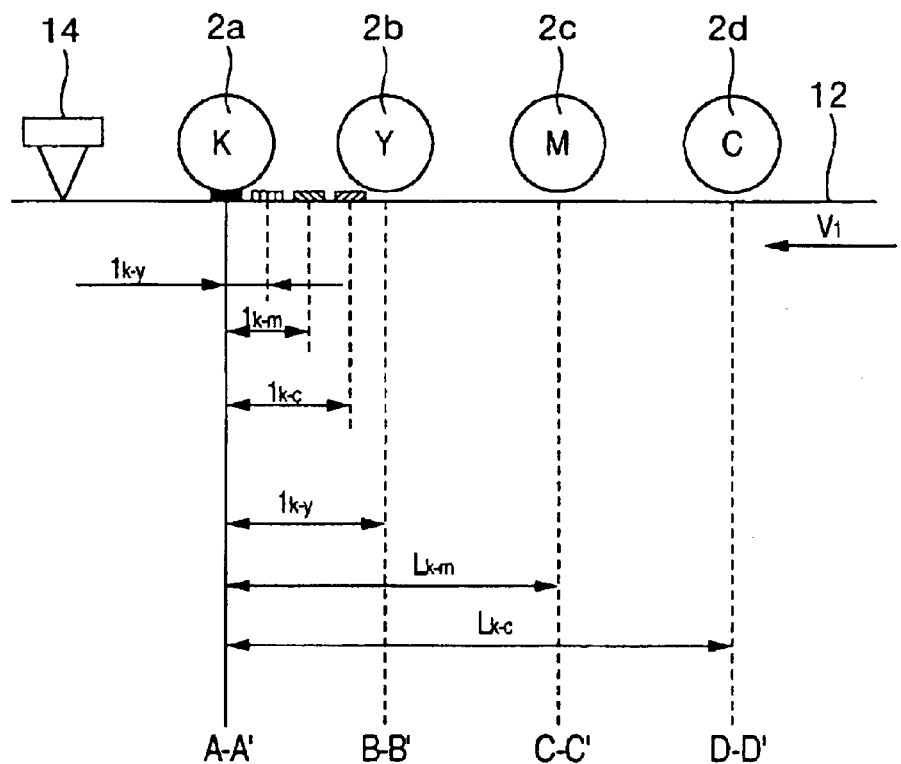
FIG. 6 is a schematic view showing a positional relationship among the register or test pattern toner images and the photo-sensitive drums.

When a difference between the actually formed test pattern toner image and the desired predetermined test pattern image is detected as shown in FIG. 3, operating timings or manners of the toner image forming stations 1a, 1b, 1c and 1d for forming the register pattern toner images respectively are adjusted to form desirable distances $l_{k-y}$, $l_{k-m}$, and $l_{k-c}$ among the register pattern toner images, and a control based on the adjusted operating timings or manners are applied to the toner image forming stations $1a$, $1b$, $1c$ and $1d$ also when the toner images to be printed on the work piece 17 are formed, so that desirable distances among the toner images to be printed are obtained.

Operations of the toner image forming stations $1a$, $1b$, $1c$ and $1d$ are explained as follows.

When a time period between a start of emitting the light beam onto the photo-sensitive drum $2a$ by the light beam emitter $6a$ and a reaching of the K register pattern toner image to the transfer position A–A' is $t_k$, a half peripheral length of the photo-sensitive drum $2a$ is $L_0$, and a rotational speed of the photo-sensitive drum $2a$ is $V_0$, $t_k$ is calculated by the following formula.

$$t_k = L_0/V_0 \tag{1}$$

When a time period $t_y$ between a start of emitting the light beam onto the photo-sensitive drum $2b$ by the light beam emitter $6b$ and a reaching of the Y register pattern toner image to a position separated from the K register pattern toner image by the distance $l_{k-y}$ is calculated as follows. When a time period between the start of emitting the light beam onto the photo-sensitive drum $2b$ by the light beam emitter $6b$ and a reaching of the Y register pattern toner image to the transfer position B–B' is $t_{y1}$, $t_{y1}$ is calculated by the following formula.

$$t_{y1} = t_k = L_0/V_0 \tag{2}$$

When a distance between the transfer position A–A' and the transfer position B–B' is $L_{k-y}$, and a distance between the Y register pattern toner image and K register pattern toner image is $l_{k-y}$, a distance $\Delta l_{k-y}$ between the transfer position B–B' and the Y register pattern toner image is calculated by the following formula.

$$\Delta l_{k-y} = L_{k-y} - l_{k-y} \tag{3}$$

When a speed of the intermediate belt 12 is $V_1$, a time period $t_{y2}$ in which the Y register pattern toner image proceeds away from the transfer position B–B' until forming the distance $l_{k-y}$ between the Y register pattern toner image and K register pattern toner image is calculated by the following formula.

$$t_{y2} = (L_{k-y} - l_{k-y})/V_1 \tag{4}$$

Therefore, the time period $t_y$ between a start of emitting the light beam onto the photo-sensitive drum $2b$ by the light beam emitter $6b$ and a reaching of the Y register pattern toner image to a position separated from the K register pattern toner image by the distance $l_{k-y}$ is calculated by the following formula.

$$t_y = t_{y1} + t_{y2} = L_0/V_0 + (L_{k-y} - l_{k-y})/V_1 \tag{5}$$

Similarly, a time period between the start of emitting the light beam onto the photo-sensitive drum $2c$ by the light beam emitter $6c$ and a reaching of the M register pattern toner image to the transfer position C–C' is $t_{m1}$, a distance $\Delta l_{k-m}$ between the transfer position C–C' and the M register pattern toner image, a time period $t_{m2}$ in which the M register pattern toner image proceeds away from the transfer position C–C' until forming the distance $l_{k-m}$ between the M register pattern toner image and K register pattern toner image, a time period $t_m$ between a start of emitting the light beam onto the photo-sensitive drum $2c$ by the light beam emitter $6c$ and a reaching of the M register pattern toner image to a position separated from the K register pattern toner image by the distance $l_{k-m}$, a time period between the start of emitting the light beam onto the photo-sensitive drum $2d$ by the light beam emitter $6d$ and a reaching of the C register pattern toner image to the transfer position D–D' is $t_{c1}$, a distance $\Delta l_{k-c}$ between the transfer position D–D' and the C register pattern toner image, a time period $t_{c2}$ in which the C register pattern toner image proceeds away from the transfer position D–D' until forming the distance $l_{k-c}$ between the C register pattern toner image and K register pattern toner image, and a time period $t_c$ between a start of emitting the light beam onto the photo-sensitive drum $2d$ by the light beam emitter $6d$ and a reaching of the C register pattern toner image to a position separated from the K register pattern toner image by the distance $l_{k-c}$ are calculated by the following formulas.

$$t_{m1} = t_{c1} = t_{k1} = L_0/V_0 \tag{6}$$

$$\Delta l_{k-m} = L_{k-m} - l_{k-m} \tag{7}$$

$$\Delta l_{k-c} = L_{k-c} - l_{k-c} \tag{8}$$

$$t_{m2} = (L_{k-m} - l_{k-m})/V_1 \tag{9}$$

$$t_{c2} = (L_{k-c} - l_{k-c})/V_1 \tag{10}$$

$$t_m = t_{m1} + t_{m2} = L_0/V_0 + (L_{k-m} - l_{k-m})/V_1 \tag{11}$$

$$t_c = t_{c1} + t_{c2} = L_0/V_0 + (L_{k-c} - l_{k-c})/V_1 \tag{12}$$

Timings Ty, Tm and Tc of the starts of emitting the light beams onto the photo-sensitive drums $2b$–$d$ by the light beam emitters $6b$–$d$ relative to a start time X of emitting the light beam onto the photo-sensitive drum $2a$ by the light beam emitter $6a$ are determined as follows.

Figure 7:
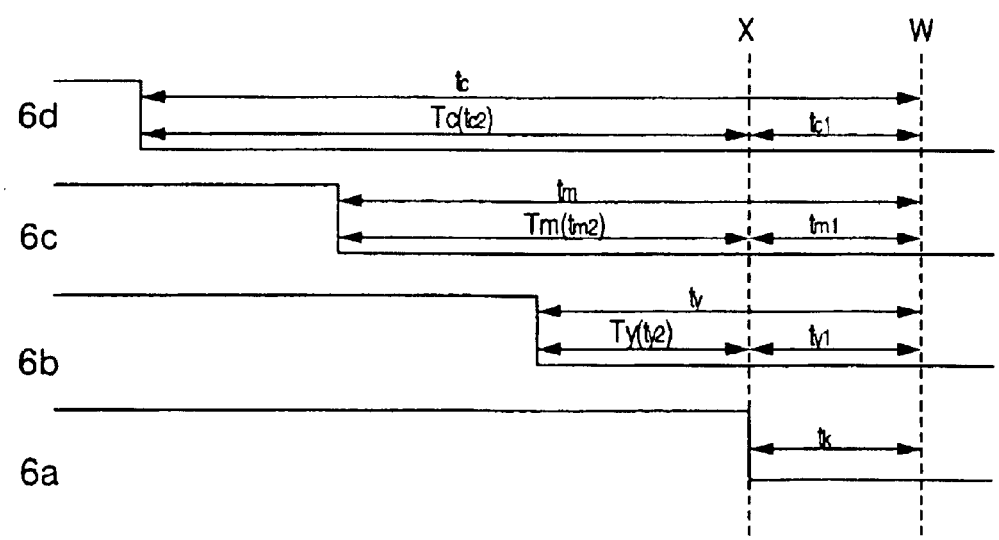
FIG. 7 is a diagram showing a time chart of starts of emitting light beams onto the photo-sensitive drums.

As shown in FIG. 7, the timings of the starts of emitting the light beams onto the photo-sensitive drums $2b$–$d$ by the light beam emitters $6b$–$d$ are earlier than the start time X of emitting the light beam onto the photo-sensitive drum $2a$ by the light beam emitter $6a$, because the photo-sensitive drum $2a$ is arranged at a downstream side of the photo-sensitive drums $2b$–$d$ in the movable direction A. The time period $t_k$ between the start time W of emitting the light beam onto the photo-sensitive drum $2a$ by the light beam emitter $6a$ and the reaching of the K register pattern toner image to the transfer position A–A' is equal to $t_{y1}$, $t_{m1}$ and $t_{c1}$.

The timings Ty, Tm and Tc are calculated by the following formulas.

$$T_y = t_{y2} = (L_{k-y} - l_{k-y})/V_1 \tag{13}$$

$$T_m = t_{m2} = (L_{k-m} - l_{k-m})/V_1 \tag{14}$$

$$T_c = t_{c2} = (L_k - l_{k-c})/V_1 \tag{15}$$

If the photo-sensitive drums $2a$–$d$ are arranged correctly with the distances $L_{k-y}$, $L_{k-m}$ and $L_{k-c}$ and the timings Ty, Tm and Tc relative to the start time X are correctly kept, the K, Y, M and C register pattern toner images are correctly arranged on the intermediate belt 12 with the distances $l_{k-y}$, $l_{k-m}$ and $l_{k-c}$.

If the photo-sensitive drums $2a$–$d$ are arranged with an error $\Delta l$ so that the distances are $L_{k-y} - \Delta l$, $L_{k-m} + \Delta l$ and $L_{k-c} - \Delta l$ respectively, the K, Y, M and C register pattern toner images are arranged with errors in the distances $l_{k-y}$, $l_{k-m}$ and $l_{k-c}$.

A proceeding length $L_y$ of the Y register pattern toner image in a time period $t_y$ ($t_{y1} + t_{y2}$) from the start time X for the start of emitting the light beam onto the photo-sensitive drums 2a to the timings Ty for the start of emitting the light beam onto the photo-sensitive drums 2b is calculated by the following formula obtained from the formula (2), (4) and (5).

$$L_y = t_{y1}*V_0 + t_{y2}*V_1 = L_0 + (L_{k-y} - l_{k-y}) \quad (19)$$

Since $L_0$ is a radius of the photo-sensitive drums 2b, a proceeding length $L_{y2}$ of the Y register pattern toner image from the transfer position B–B' is calculated by the following formula.

$$L_{y2} = L_{k-y} - 1 \quad (20)$$

Based on that the distance between the photo-sensitive drums 2a and 2b is $L_{k-y} - \Delta l$, a distance between the transfer position A–A' and the Y register pattern toner image, that is, a distance $l_{k-y}'$ between the Y and K register pattern toner images is calculated by the following formula.

$$l_{k-y}' = (L_{k-y} - \Delta l) - L_{y2} = (L_{k-y} - \Delta l) - (L_{k-y} - l_{k-y}) = L_{k-y} - \Delta l \quad (21)$$

Similarly, a distance $l_{k-m}'$ between the M and K register pattern toner images and a distance $l_{k-c}'$ between the C and K register pattern toner images are calculated by the following formulas.

$$l_{k-m}' = L_{k-m} \Delta l \quad (22)$$

$$l_{k-c}' = L_{k-c} - \Delta l \quad (23)$$

When the K register pattern toner image reaches the transfer position A–A', the Y, M and C register pattern toner images are arranged with the positional errors among them as shown in FIG. 3.

Figure 8:
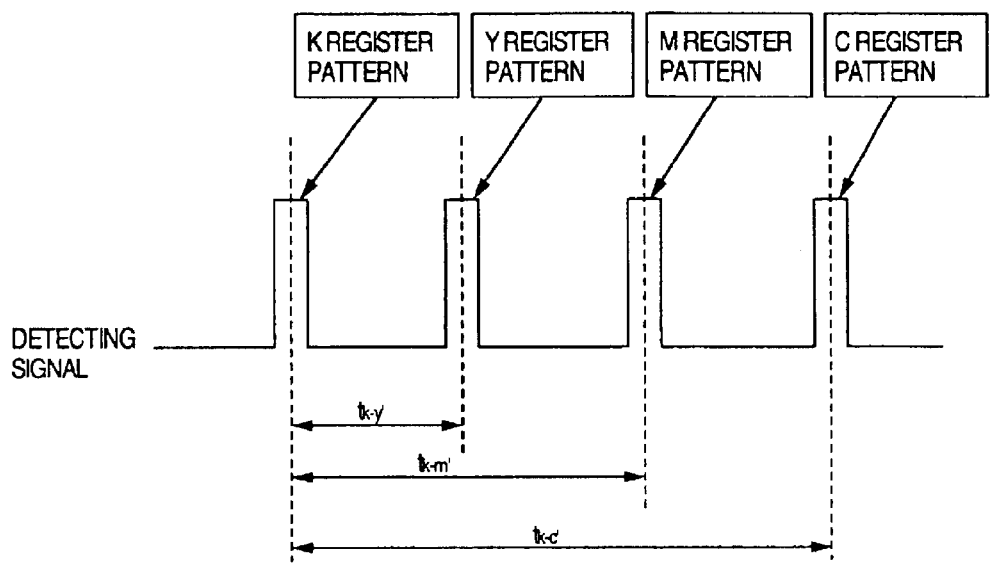
FIG. 8 is a diagram showing output signals of a test pattern toner image detector corresponding to distances between the register or test pattern toner images when an intermediate belt proceeds at a constant speed.

The K, Y, M and C register pattern toner images as the claimed test pattern toner image moved by the movable intermediate belt 12 are detected by a register or test pattern toner image detector 14 to generate output signals as shown in FIG. 8. From each of the output signals, a time period $t_{k-y}'$, $t_{k-m}'$ or $t_{k-c}'$ between a start of detection of the K register pattern toner image and a start of detection of respective one of the Y, M and C register pattern toner images is obtained. A relationship between the time period $t_{k-y}'$, $t_{k-m}'$ or $t_{k-c}'$ and the distances $l_{k-y}'$, $l_{k-m}'$ or $l_{k-c}'$ is determined as follows.

$$t_{k-y}' = l_{k-y}'/V_1 = (l_{k-y} - \Delta l)*V_1 \quad (24)$$

$$t_{k-m}' = l_{k-m}'/V_1 = (l_{k-m} + \Delta l)*V_1 \quad (25)$$

$$t_{k-c}' = l_{k-c}'/V_1 = (l_{k-c} - \Delta l)*V_1 \quad (26)$$

Normal time periods $t_{k-y}$, $t_{k-m}$ and $t_{k-c}$ obtained if the desired distances $l_{k-y}$, $l_{k-m}$ and $l_{k-c}$ and the correct distances $L_{k-y}$, $L_{k-m}$ and $L_{k-c}$ are not influenced by the error $\Delta l$ are calculated by the following formulas.

$$t_{k-y} = l_{k-y}/V_1 \quad (27)$$

$$t_{k-m} = l_{k-m}/V_1 \quad (28)$$

$$t_{k-c} = l_{k-c}/V_1 \quad (29)$$

Therefore, time difference $\Delta t_{k-y}$, $\Delta t_{k-m}$ and $\Delta t_{k-c}$ between the normal time periods $t_{k-y}$, $t_{k-m}$ and $t_{k-c}$ and the actually detected time period $t_{k-y}'$, $t_{k-m}'$ or $t_{k-c}'$ influenced by the error $\Delta l$ regarding the distances $L_{k-y}$, $L_{k-m}$ and $L_{k-c}$ are calculated by the following formulas.

$$\Delta t_{k-y} = t_{k-y}' - t_{k-y} \quad (30)$$

$$\Delta t_{k-m} = t_{k-m}' - t_{k-m} \quad (31)$$

$$\Delta t_{k-c} = t_{k-c}' - t_{k-c} \quad (32)$$

An error $z_{k-y}$, $z_{k-m}$ or $z_{k-c}$ in distance between the K register pattern toner image and respective one of the Y, M and C register pattern toner images are calculated by the following formulas.

$$z_{k-y} = \Delta t_{k-y}*V_1 = (t_{k-y}' - t_{k-y})*V_1 = t_{k-y}'*V_1 + t_{k-y}*V_1 = (l_{k-y} - \Delta l) - l_{k-y} = -\Delta \quad (33)$$

$$z_{k-m} = \Delta t_{k-m}*V_1 = (t_{k-m}' - t_{k-m})*V_1 = t_{k-m}'*V_1 + t_{k-m}*V_1 = (l_{k-m} + \Delta l) - l_{k-m} = \Delta l \quad (34)$$

$$z_{k-c} = \Delta t_{k-c}*V_1 = (t_{k-c}' - t_{k-c})*V_1 = t_{k-c}'*V_1 + t_{k-c}*V_1 = (l_{k-c} - \Delta l) - l_{k-c} = -\Delta l \quad (35)$$

If the timings Ty for the start of emitting the light beam onto the photo-sensitive drums 2b, Tm for the start of emitting the light beam onto the photo-sensitive drums 2c and Tc for the start of emitting the light beam onto the photo-sensitive drums 2d relative to the start time X for the start of emitting the light beam onto the photo-sensitive drums 2a are adjusted respectively by the time difference $\Delta t_{k-y}$, $\Delta t_{k-m}$ and $\Delta t_{k-c}$ obtained on the basis of the detection of the K, Y, M and C register pattern toner images as the claimed test pattern toner image when a multi-color toner image corresponding to a desired image to be printed is formed by the photo-sensitive drums 2a–d, the toner image is correctly formed similarly to that the register or test pattern toner image is correctly formed by the adjustment of the timings Ty, Tm and Tc with the respective time differences $\Delta t_{k-y}$, $\Delta t_{k-m}$ and $\Delta t_{k-c}$. The timings Ty', Tm' and Tc' adjusted by the respective time differences $\Delta t_{k-y}$, $\Delta t_{k-m}$ and $\Delta t_{k-c}$ are calculated by the following formulas.

$$T_y' = T_y + \Delta t_{k-y} \quad (36)$$

$$T_m' = T_m + \Delta t_{k-m} \quad (37)$$

$$T_c' = T_c + \Delta t_{k-c} \quad (38)$$

When the formation of the Y register pattern toner image is started with the timing Ty', a time period ty' from the start of the formation of the Y register pattern toner image and a reaching of the K register pattern toner image to the transfer position A–A' is calculated from a time period $t_{y1}$ in which the Y register pattern toner image proceeds on a half of the outer periphery of the photo-sensitive drum 2b and one of a time period $t_{y2}'$ in which the Y register pattern toner image on the intermediate belt 12 proceeds to a position separated by a predetermined distance from the K register pattern toner image reaching the transfer position A–A' and the timing Ty' by the following formulas.

$$t_y' = t_{y1} + t_{y2}' \quad (39)$$

$$t_y' = t_{y1} + T_y' \quad (40)$$

A length $L_{y2}'$ by which the Y register pattern toner image on the intermediate belt 12 proceeds to the position separated by the predetermined distance from the K register pattern toner image reaching the transfer position A–A' is calculated by the following formulas when the speed of the intermediate belt 12 is $V_1$.

$$L_{y2}' = T_y'*V_1 = (T_y + $$

$$\Delta t_{k-y})*V_1 = T_y*V_1$$

$$+ (t_{k-y}' - t_{k-y})*V_1$$

$$= (L_{k-y} - l_{k-y})/V_1*V_1$$

$$+ (l_{k-y} - \Delta l)/V_1*V_1$$

$$-l_{k\text{-}y}/V_1*V_1 = L_{k\text{-}y} - l_{k\text{-}y}$$

$$+(l_{k\text{-}y} - \Delta l) - l_{k\text{-}y}$$

$$=(L_{k\text{-}y} - \Delta l) - l_{k\text{-}y} \tag{41}$$

Since $(L_{k\text{-}y} - \Delta l)$ is a distance between the photo-sensitive drums 2a and 2b, the Y register pattern toner image on the intermediate belt 12 proceeds to the position separated by $l_{k\text{-}y}$ from the K register pattern toner image reaching the transfer position A–A'.

Similarly, a length $L_{m2}'$ by which the M register pattern toner image on the intermediate belt 12 proceeds to the position separated by the predetermined distance from the K register pattern toner image reaching the transfer position A–A' and a length $L_{c2}'$ by which the C register pattern toner image on the intermediate belt 12 proceeds to the position separated by the predetermined distance from the K register pattern toner image reaching the transfer position A–A' is calculated by the following formulas.

$$L_{m2}' = (L_{k\text{-}m} + \Delta l) - l_{k\text{-}m} \tag{42}$$

$$L_{c2}' = (L_{k\text{-}c} - \Delta l) - l_{k\text{-}c} \tag{43}$$

Since $(L_{k\text{-}m} + \Delta l)$ is a distance between the photo-sensitive drums 2a and 2c, the M register pattern toner image on the intermediate belt 12 proceeds to the position separated by $l_{k\text{-}m}$ from the K register pattern toner image reaching the transfer position A–A', and since $(L_{k\text{-}c} - \Delta l)$ is a distance between the photo-sensitive drums 2a and 2d, the C register pattern toner image on the intermediate belt 12 proceeds to the position separated by $l_{k\text{-}c}$ from the K register pattern toner image reaching the transfer position A–A'. Therefore, an error in distance among the K, Y, M and C register pattern toner images is prevented.

The speed $V_1$ of the intermediate belt 12 obtained when the pressing roller 19 is prevented from being pressed against the intermediate belt 12 is larger than a speed $V_1'$ of the intermediate belt 12 obtained when the pressing roller 19 is pressed against the intermediate belt 12. When the toner image is printed on the work piece, since the pressing roller 19 is pressed against the intermediate belt 12, the intermediate belt 12 proceeds with the speed $V_1'$.

A length $L_{y2}''$ by which the Y register pattern toner image on the intermediate belt 12 proceeds to the position separated by the predetermined distance from the K register pattern toner image reaching the transfer position A–A' is calculated by the following formulas when the speed of the intermediate belt 12 is $V_1'$.

$$L_{y2} = V_1' * t_{y2}' = (T_y$$

$$+\Delta t_{k\text{-}y}) * V_1' = T_y * V_1$$

$$'+(t_{k\text{-}y}' - t_{k\text{-}y}) * V_1' =$$

$$(L_{k\text{-}y} - l_{k\text{-}y})/V_1 * V_1'$$

$$+(l_{k\text{-}y} - \Delta l)/V_l * V_1'$$

$$-l_{k\text{-}y}/V_1 * V_1' = (L_{k\text{-}y} -$$

$$l_{k\text{-}y} + (l_{k\text{-}y} - \Delta l) + l_{k\text{-}y}) * V_1$$

$$'/V_1 = (L_{k\text{-}y} - \Delta l - l_{k\text{-}y}) * V_1$$

$$'/V_1 \tag{44}$$

Since $(L_{k\text{-}y} - \Delta l)$ is a distance between the photo-sensitive drums 2a and 2b, a distance $l_{k\text{-}y}''$ between the K and Y register pattern toner images is a difference between the distance $(L_{k\text{-}y} - \Delta l)$ and the length $L_{y2}''$. The distance $l_{k\text{-}y}''$ is calculated by the following formula.

$$l_{k\text{-}y}'' = L_{k\text{-}y} - L_{y2}'' = L_{k\text{-}y} - \Delta l - (L_{k\text{-}y} - \Delta l - l_{k\text{-}y}) * V_1'/V_1 \tag{45}$$

An error $z_{k\text{-}y}'$ in distance between the K and Y register pattern toner images caused by the change in speed of the intermediate belt 12 is calculated by the following formula.

$$z_{k\text{-}y}' = l_{k\text{-}y}'' - l_{k\text{-}y} =$$

$$L_{k\text{-}y} - \Delta l - (L_{k\text{-}y} - \Delta l -$$

$$l_{k\text{-}y}) * V_1'/V_1 - l_{k\text{-}y} =$$

$$(L_{k\text{-}y} - \Delta l - l_{k\text{-}y}) * V_1'/V_1$$

$$-(L_{k\text{-}y} - \Delta l - l_{k\text{-}y}) * V_1'/V_1 =$$

$$L_{k\text{-}y} - \Delta l - l_{k\text{-}y}) * (V_1 - V_1$$

$$')/V_1 \tag{46}$$

Similarly, a distance $l_{k\text{-}m}''$ between the K and M register pattern toner images and a distance $l_{k\text{-}c}''$ between the K and C register pattern toner images obtained when the speed of the intermediate belt 12 is $V_1'$ are calculated by the following formulas.

$$l_{k\text{-}m}'' = L_{k\text{-}m} - \Delta l - (L_{k\text{-}m} - \Delta l - l_{k\text{-}m}) * V_1'/V_1 \tag{47}$$

$$l_{k\text{-}c}'' = L_{k\text{-}c} - \Delta l - (L_{k\text{-}c} - \Delta l - l_{k\text{-}c}) * V_1'/V_1 \tag{48}$$

Figure 9:
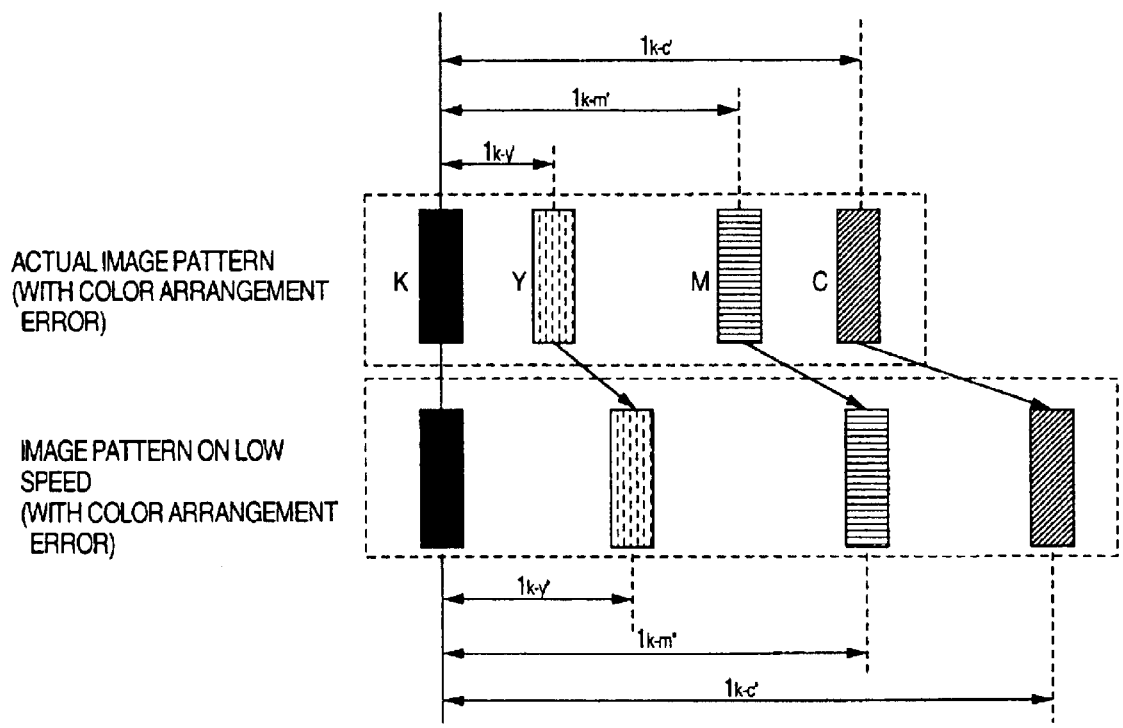
FIG. 9 is a schematic view showing an error in positional relationship among register or test pattern toner images of respective colors caused by a change of intermediate belt speed.

As shown in FIG. 9, when the speed $V_1'$ is smaller than the speed $V_1$, the distances $l_{k\text{-}y}''$, $l_{k\text{-}m}''$ and $l_{k\text{-}c}''$ are larger than the distances $l_{k\text{-}y}'$, $l_{k\text{-}m}'$ and $l_{k\text{-}c}'$ respectively.

In order to prevent differences between the distances $l_{k\text{-}y}''$, $l_{k\text{-}m}''$ and $l_{k\text{-}c}''$ and the distances $l_{k\text{-}y}'$, $l_{k\text{-}m}'$ and $l_{k\text{-}c}'$ caused by a difference between the speed of $V_1'$ and the speed of $V_1$, according to the present invention, the pressing roller 19 is pressed against the intermediate belt 12 during at least a time period between a timing at which at least one of the K, Y, M and C register pattern toner images reaches, at the start, corresponding one of the transfer positions and a timing at which a detection of all of the K, Y, M and C register pattern toner images by the register or test pattern toner image detector 14 is completed, that is, during a time period in which at least one of the K, Y, M and C register pattern toner images exist between the register or test pattern toner image detector 14 and the one of the transfer positions most far away from the register or test pattern toner image detector 14.

Figure 18:
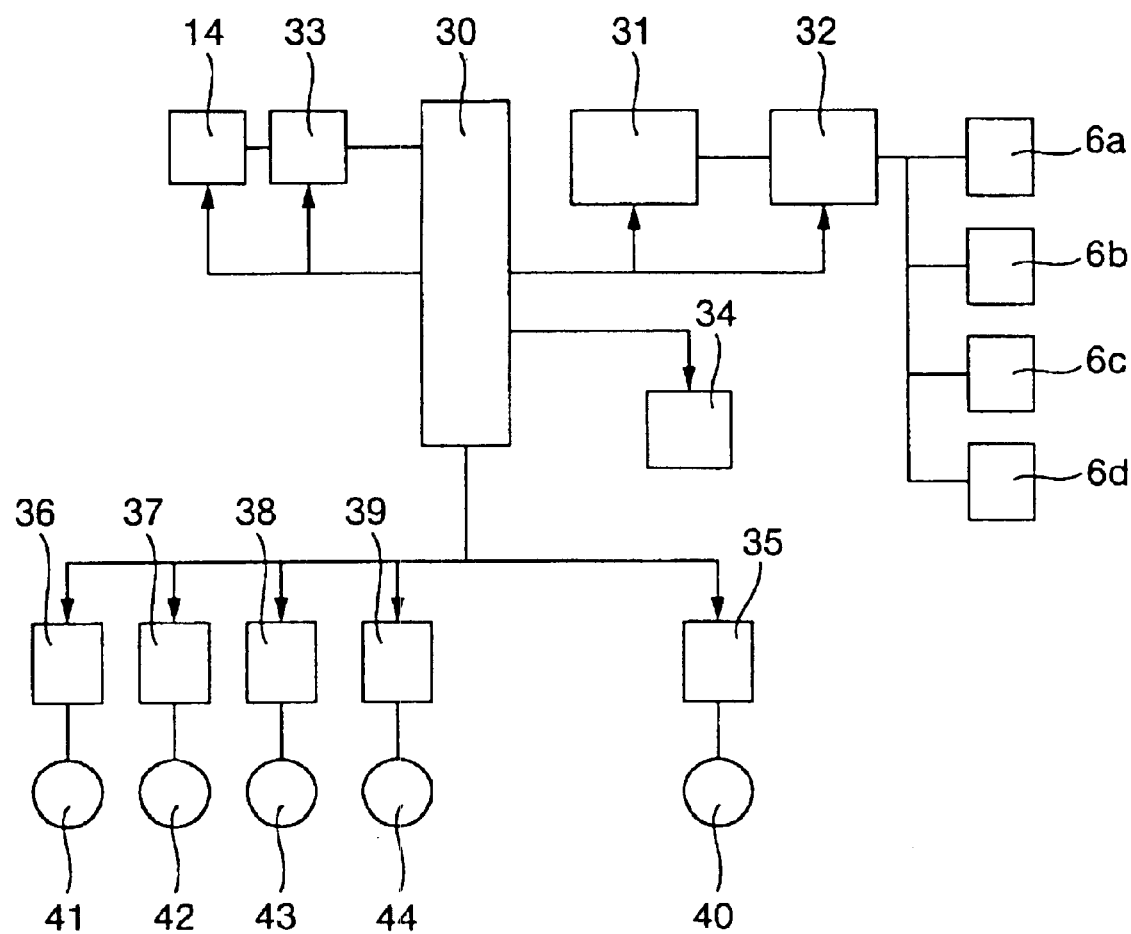
FIG. 18 is a schematic view showing a control system of the toner image forming apparatus of the invention.
Figure 19A:
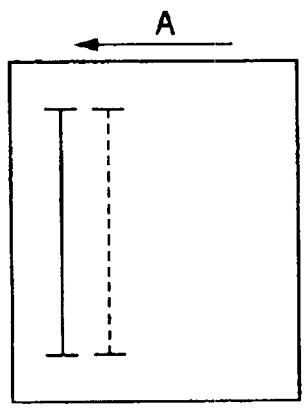
FIGS. 19a–e are schematic views showing differences between actually formed toner images and desired images or between actually formed register or test pattern toner images and desired register or test pattern images.
Figure 19B:
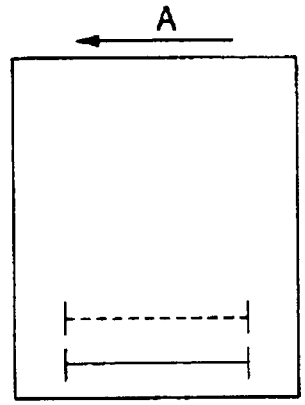
Figure 19C:
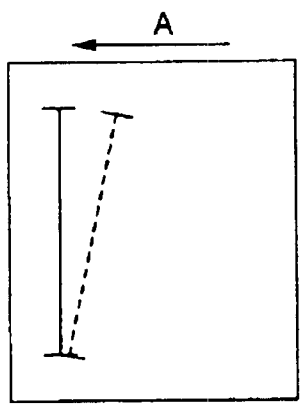
Figure 19D:
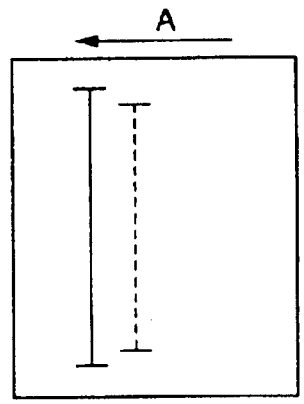
Figure 19E:
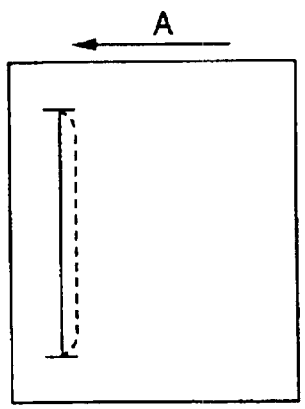

As shown in FIG. 18, a control system of the toner image forming apparatus has a main controller 30, an image signal generator 31 for generating output signals corresponding to either of the desired register or test pattern image and the desired image to be printed, a light emitter controller 32 for controlling operations of the light beam emitters 6a, 6b, 6c and 6s in accordance with the output signals, a memory 33 for recording the time period between the start of detection of the K register pattern toner image and the start of detection of each of the Y, M and C register pattern toner images, a clutch 34 for controlling the pressing of the pressing roller 19 against the intermediate belt 12, a belt drive motor driver 35 for controlling a belt drive motor 40 for driving the intermediate belt 12, and drum drive motor drivers 36–39 for controlling drum drive motors 41–44 for driving the photo-sensitive drums 2a–d.

At first, the intermediate belt 12 and the photo-sensitive drums 2a–d are rotated, and the pressing roller 19 is pressed against the intermediate belt 12 by the clutch 34.

Figure 10:
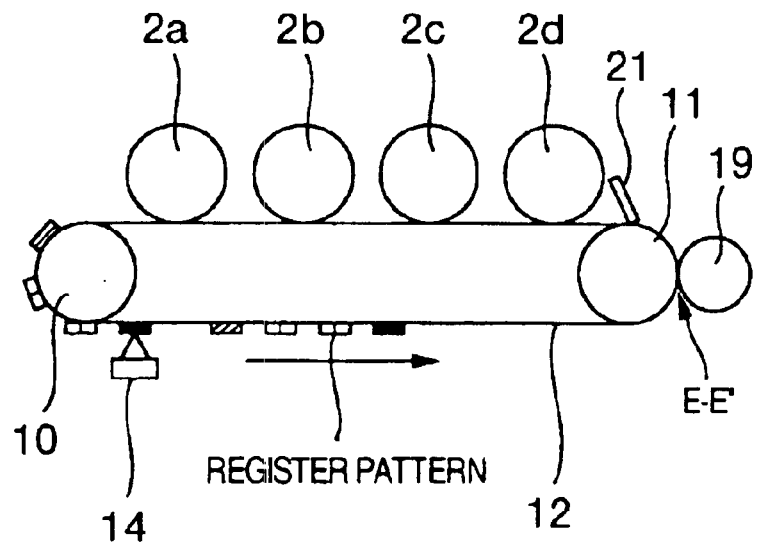
FIG. 10 is a schematic view showing a relationship among a Test pattern toner image detector, a pressing position and a length of a set of the register or test pattern toner images to be detected as the claimed register or test pattern toner image.

Subsequently, the light beam emitters 6a, 6b, 6c and 6s emit respective light beams onto the photo-sensitive drums 2a–d with the timings as shown in FIG. 7, in accordance with an instruction from the light emitter controller 32 on the basis of the output signals of the desired register or test pattern image from the image signal generator 31, so that latent images for the desired register or test pattern image as parts of the claimed desired test pattern image are formed on respectively the photo-sensitive drums 2a–d. The latent images are developed with toners of respective colors supplied from the developing devices 4a, 4b, 4c and 4b to form the register or test pattern toner images respectively. The register or test pattern toner images as parts of the claimed test pattern toner image are transferred from the photo-sensitive drums 2a–d onto the intermediate belt 12 by the toner drawing devices 8a, 8b, 8c and 8d. The register or test pattern toner images on the intermediate belt 12 are detected by the register or test pattern toner image detector 14 as shown in FIG. 10.

Figure 11:
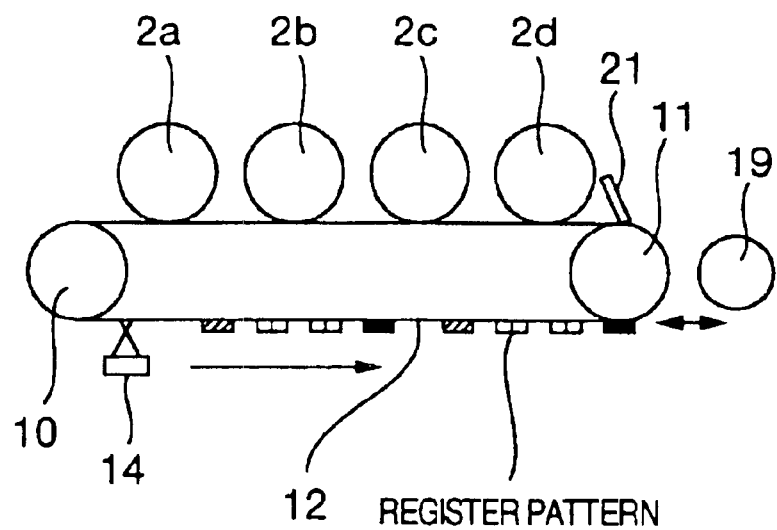
FIG. 11 is a schematic view showing a relationship among a Test pattern toner image detector, a pressing position and a length of a set of the register or test pattern toner images to be detected as the claimed register or test pattern toner image.
Figure 12:
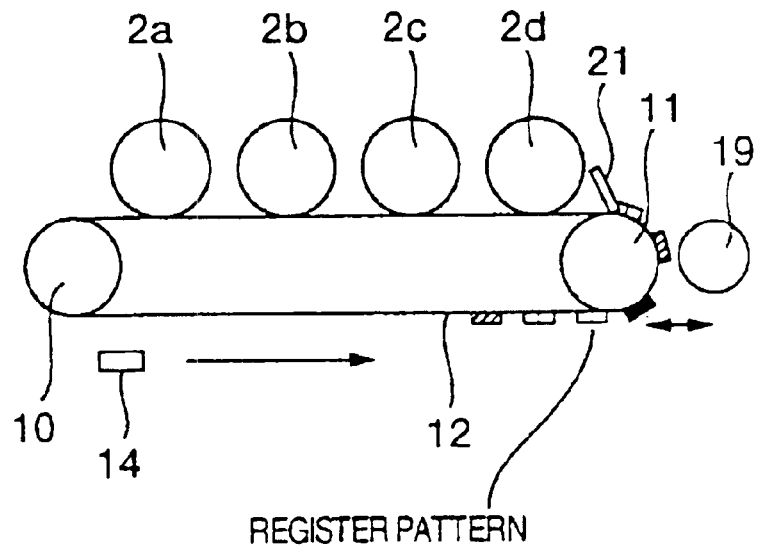
FIG. 12 is a schematic view showing a relationship among a Test pattern toner image detector, a pressing position and a length of a set of the register or test pattern toner images to be detected as the claimed register or test pattern toner image.

The clutch 34 prevents the pressing roller 19 from being pressed against the intermediate belt 12 before the register or test pattern toner images reaches the pressing position as shown in FIG. 11 and while the register or test pattern toner images passes the pressing position so that a contamination of the pressing roller 19 by the toner of the register or test pattern toner images is prevented. The register or test pattern toner images are removed from the intermediate belt 12 by a cleaning device 21 as shown in FIG. 12.

Figure 13:
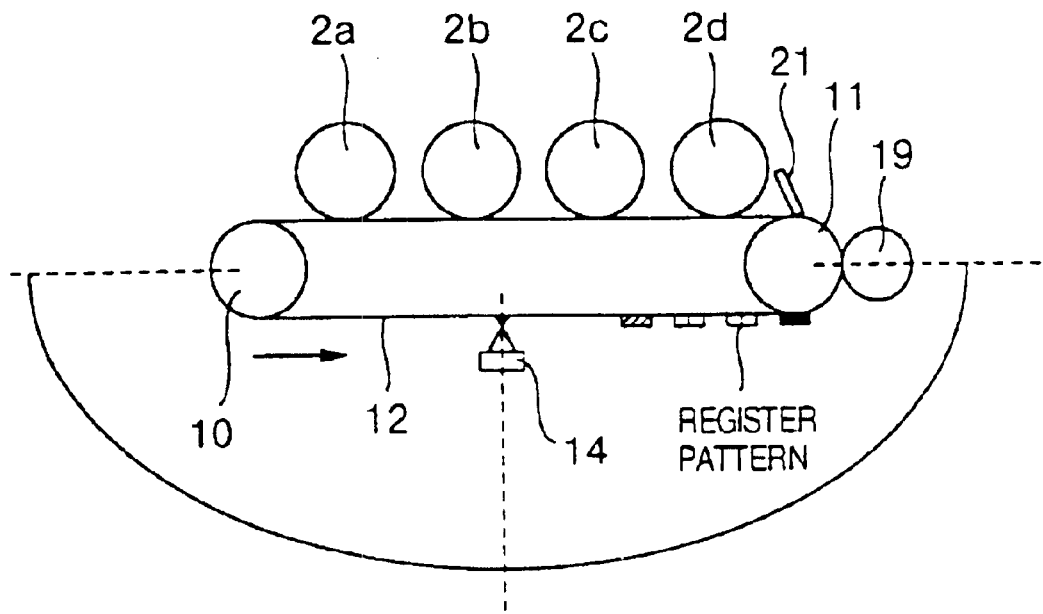
FIG. 13 is a schematic view showing a relationship among a test pattern toner image detector, a pressing position and a length of a set of the register or test pattern toner images to be detected as the claimed register or test pattern toner image.
Figure 14:
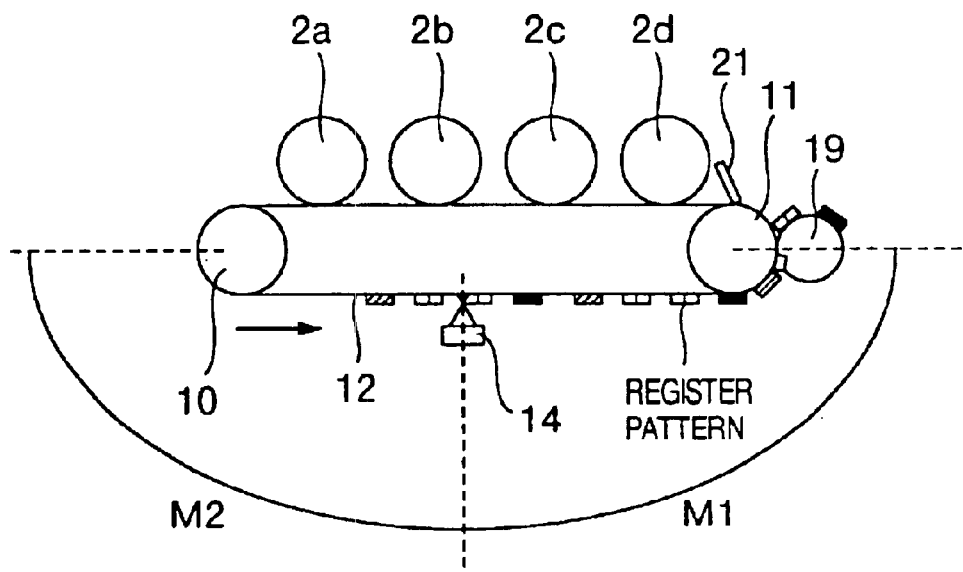
FIG. 14 is a schematic view showing a relationship among a Test pattern toner image detector, a pressing position and a length of a set of the register or test pattern toner images to be detected as the claimed register or test pattern toner image.
Figure 15:
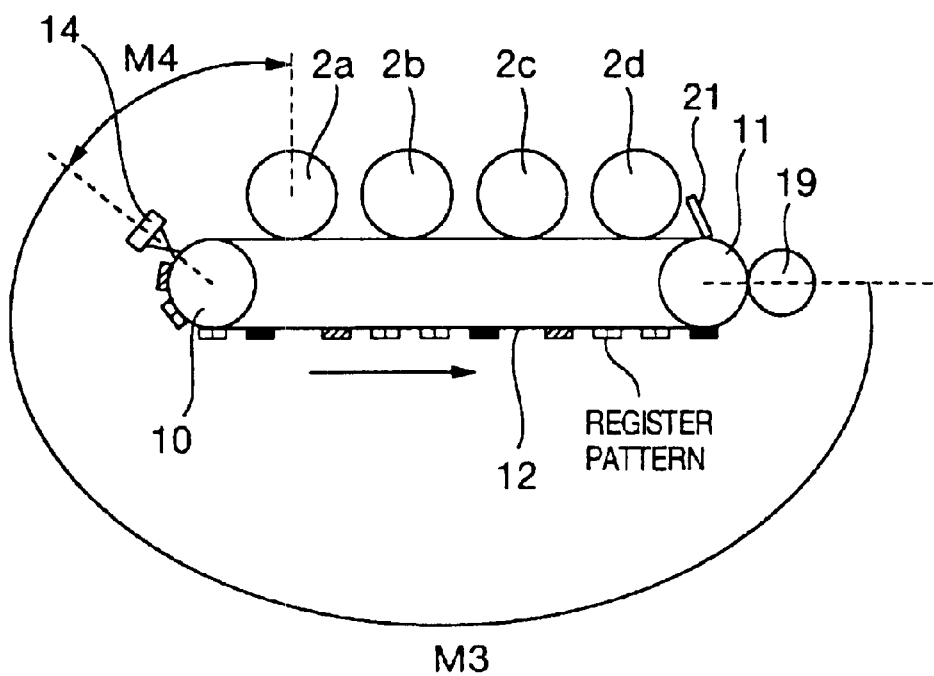
FIG. 15 is a schematic view showing a relationship among a Test pattern toner image detector, a pressing position and a length of a set of the register or test pattern toner images to be detected as the claimed register or test pattern toner image.

As shown in FIG. 13, when a length of an array of the register or test pattern toner images is short, the register or test pattern toner image detector 14 may be arranged between the rollers 10 and 11. As shown in FIG. 14, when the length of the array of the register or test pattern toner images is long and the register or test pattern toner image detector 14 is arranged between the rollers 10 and 11, the register or test pattern toner images reach the pressing position before the detection of all of the register pattern toner images by the register or test pattern toner image detector 14 is completed. Therefore, as shown in FIG. 15, a difference between a distance M4 between the test pattern toner image detector 14 and the transfer position of the photo-sensitive drums 2a adjacent to the test pattern toner image detector 14 and a distance M3 between the test pattern toner image detector 14 and the pressing position longer than the distance M4 is preferably as large as possible.

Figure 16:
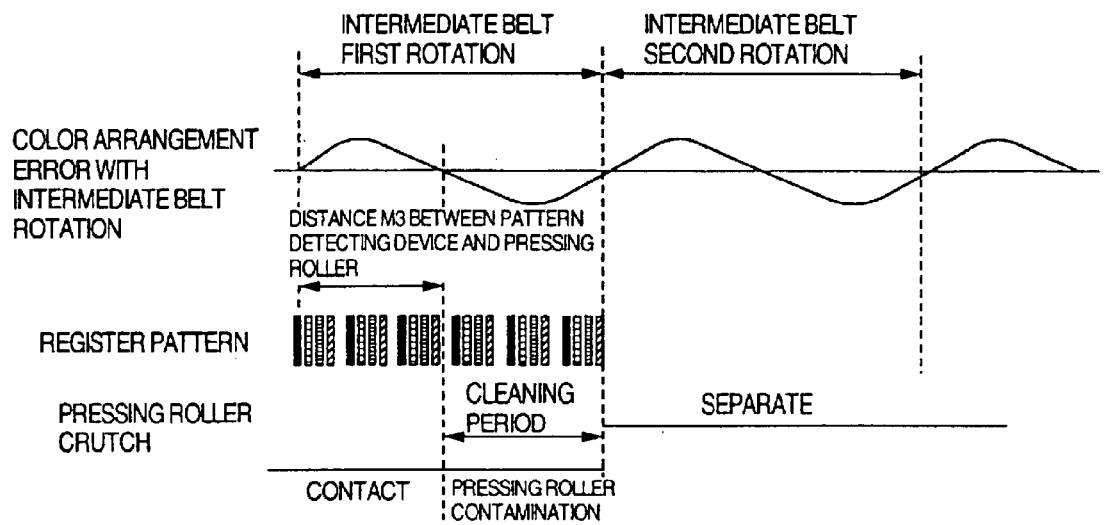
FIG. 16 is a diagram showing a relationship among a rotation of the intermediate belt, a pressing condition of a pressing roller, a distance between a pressing position and the test pattern toner image detector and the length of the set of the register or test pattern toner images to be detected as the claimed register or test pattern toner image.
Figure 17:
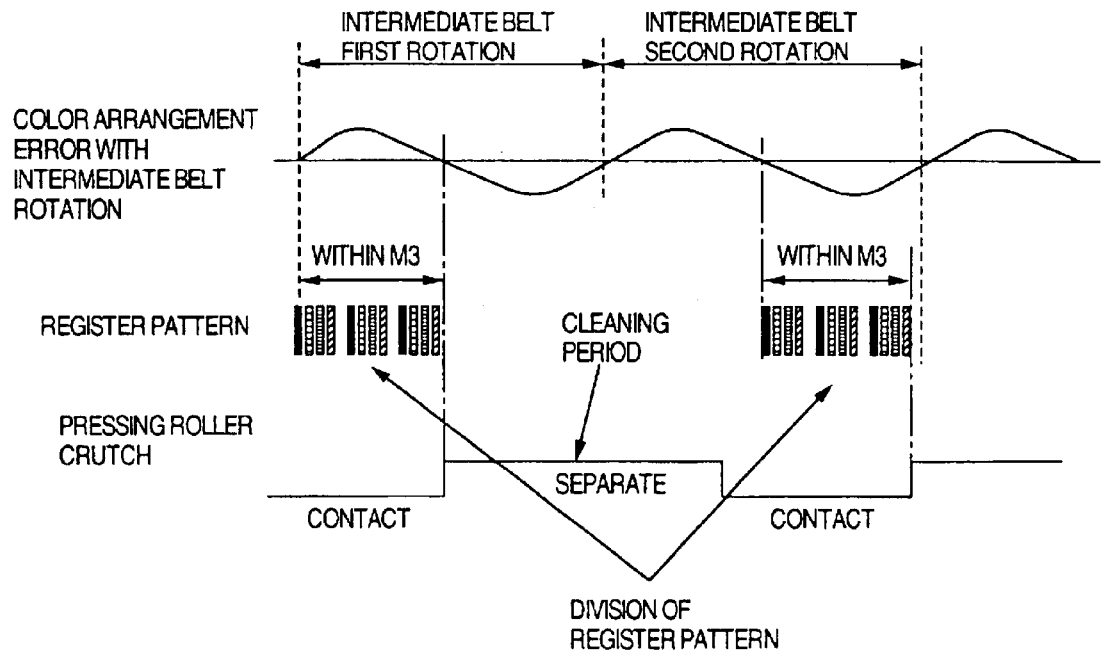
FIG. 17 is a diagram showing a relationship among a rotation of the intermediate belt, a pressing condition of a pressing roller, a distance between a pressing position and the test pattern toner image detector and parts of the length of the set of the register or test pattern toner images to be detected as the claimed register or test pattern toner image.

When the length of the array of the register or test pattern toner images to be detected by the register or test pattern toner image detector 14 is longer than the distance M3 between the test pattern toner image detector 14 and the pressing position, for example, the length of the array of the register or test pattern toner images is equal to a length of the intermediate belt 12, as shown in FIG. 16, a register or test pattern toner image length of a difference between the length of the array of the register or test pattern toner images and the distance M3 between the test pattern toner image detector 14 and the pressing position passes the pressing position to contaminate the pressing roller 19. If the array of the register or test pattern toner images has at least one non-toner area to divide the array of the register or test pattern toner images into at least two portions of register or test pattern toner images with the non-toner area therebetween, the pressing roller is pressed against the intermediate belt 12 when the non-toner area passes the pressing position, and the pressing roller 19 is prevented from being pressed against the intermediate belt 12 when the at least two portions of register or test pattern toner images with the toner thereon pass the pressing position, as shown in FIG. 17, the pressing roller 19 is prevented from being contaminated by the array of the register or test pattern toner images.

What is claimed is:

1. A toner image forming apparatus, comprising:
   an image forming device that is operable to form thereon a toner image corresponding to a desired image to be printed on a work piece and a test pattern toner image which is prevented from being transferred onto the work piece and corresponds to a desired test pattern image;
   a movable transfer member that is operable to hold thereon the toner image and test pattern toner image, facing to the image forming device to transfer the toner image and test pattern toner image from the image forming device onto the transfer member at a transfer position;
   a contact member that is operable to press the work piece against the toner image on the transfer member at a pressing position so that the toner image is transferred from the transfer member onto the work piece at the pressing position;
   a test pattern toner image detector that is operable to detect the test pattern toner image on the transfer member at a detecting position so that a difference between the test pattern toner image on the transfer member and the desired test pattern image is obtained; and
   a controller that is operable to control a formation of the toner image on the image forming device with the substantially same control manner as a control manner for decreasing the difference between the test pattern toner image and the desired test pattern image, so that a difference between the toner image and the desired image is decreased, wherein
   the contact member is pressed against the transfer member while the test pattern toner image on the transfer member moves from the transfer position to the detecting position, and
   the contact member is prevented from being pressed against the transfer member to prevent the test pattern toner image from being transferred from the transfer member onto the contact member when the test pattern toner image on the transfer member passes the pressing position after passing the detecting position.

2. An apparatus according to claim 1, wherein the contact member is pressed against the transfer member while the toner image on the transfer member moves from the transfer position to the detecting position.

3. An apparatus according to claim 1, wherein a pressing force for pressing the contact member against the transfer member while the test pattern toner image on the transfer member moves from the transfer position to the detecting position is substantially equal to a pressing force of the contact member for pressing the work piece against the toner image on the transfer member.

4. An apparatus according to claim 1, wherein a pressing force of the contact member for pressing the work piece against the toner image on the transfer member is substantially equal to a pressing force for pressing the contact member against the transfer member while the toner image on the transfer member moves from the transfer position to the detecting position.

5. An apparatus according to claim 1, wherein the contact member prevents the work piece from being pressed against the test pattern toner image on the transfer member so that the test pattern toner image is prevented from being transferred from the transfer member onto the work piece at the pressing position.

6. An apparatus according to claim 1, wherein the work piece is prevented from being supplied onto the pressing position when the test pattern toner image on the transfer member passes the pressing position.

7. An apparatus according to claim 1, wherein the contact member is pressed against the transfer member after the test pattern toner image on the transfer member passes the detecting position.

8. An apparatus according to claim 1, wherein the contact member is prevented from being pressed against the transfer member before the test pattern toner image on the transfer member reaches the pressing position.

9. An apparatus according to claim 1, wherein a length between the transfer position and the detecting position is smaller than a length between the detecting position and the pressing position, along a movement course of the test pattern toner image on the movable transfer member.

10. An apparatus according to claim 1, wherein a length of the test pattern toner image is smaller than a length between the detecting position and the pressing position, along a movement course of the test pattern toner image on the movable transfer member.

11. An apparatus according to claim 1, wherein the image forming device forms a plurality of the test pattern toner images corresponding respectively to the desired test pattern images, the test pattern toner image detector detects the test pattern toner images on the transfer member at the detecting position so that the differences between the test pattern toner images on the transfer member and the desired test pattern images are obtained, the controller controls the formation of the toner image on the image forming device in the same manner as a manner for decreasing the differences regarding the test pattern toner images, so that a difference between the toner image and the desired image is decreased, and the contact member is pressed against the transfer member while each of the test pattern toner images on the transfer member moves from the transfer position to the detecting position.

12. An apparatus according to claim 11, wherein a length of a combination of the test pattern toner images is larger than a length between the detecting position and the pressing position, along a movement course of the test pattern toner image on the movable transfer member.

13. An apparatus according to claim 1, wherein the contact member is pressed against the transfer member when the test pattern toner image is transferred onto the transfer member at the transfer position.

14. An apparatus according to claim 1, wherein the contact member is pressed against the transfer member when the test pattern toner image on the transfer member is detected at the detecting position.

15. An apparatus according to claim 1, wherein the difference between the test pattern toner image and the desired test pattern image is a difference in at least one of width, length, attitude, size, shape and position therebetween, and the difference between the toner image and the desired image is a difference in the at least one of width, length, attitude, size, shape and position therebetween.

16. An apparatus according to claim 1, wherein the image forming device includes at least two image forming drums that are operable to form thereon respective parts of the toner image corresponding to respective parts of the desired toner image and respective parts of the test pattern toner image corresponding to respective parts of the desired test pattern image, the controller is operable to control formations of the parts of the toner image on the respective image forming drums, the difference between the test pattern toner image on the transfer member and the desired test pattern image is a difference between a positional relationship between the parts of the test pattern toner image and a positional relationship between the parts of the desired test pattern image corresponding to the parts of the test pattern toner image, and the difference between the toner image and the desired image is a difference between a positional relationship between the parts of the desired image corresponding to the parts of the toner image.

17. An apparatus according to claim 1, wherein the contact member is continuously pressed against the transfer member while the test pattern toner image on the transfer member exists between the transfer position and the detecting position.

18. An apparatus according to claim 1, wherein the image forming device has a photo-sensitive drum that is operable to form thereon latent images of the toner image and test pattern toner image to be developed with toner, and a light beam emitter that is operable to emit a light beam onto the photo-sensitive drum to form the latent images, and the control manner for decreasing the difference between the test pattern toner image and the desired test pattern image is a control manner for adjusting at least one of a positioning of the emitted light beam on the photo-sensitive drum and a timing of emitting the light beam onto the photo-sensitive drum rotated synchronously with a movement of the transfer member so that the difference between the test pattern image is decreased.

19. An apparatus according to claim 1, wherein the control manner for decreasing the difference between the test pattern toner image and the desired test pattern image is modified to be applied to the controlling the formation of the toner image, in accordance with a difference between a condition in which the test pattern toner image is formed and detected and a condition in which the toner image is formed.

20. An apparatus according to claim 1, wherein the test pattern toner image on the transfer member moves from the detecting position to the pressing position.

21. A toner image forming apparatus, comprising:
 an image forming means for forming thereon a toner image corresponding to a desired image to be printed on a work piece and a test pattern toner image which is prevented from being transferred onto the work piece and corresponds to a desired test pattern image;
 a movable transfer means for forming thereon the toner image and test pattern toner image, facing to the image forming means to transfer the toner image and test pattern toner image from the image forming means onto the transfer means at a transfer position;
 a contact means for pressing the work piece against the toner image on the transfer means at a pressing position so that the toner image is transferred from the transfer means onto the work piece at the pressing position;
 a test pattern toner image detecting means for detecting the test pattern toner image on the transfer means at a detecting position so that a difference between the test pattern toner image on the transfer means and the desired test pattern image is obtained; and
 a controller means for controlling a formation of the toner image on the image forming means with the substantially same control manner as a control manner for decreasing the difference between the test pattern toner image and the desired test pattern image, so that a difference between the toner image and the desired image is decreased, wherein
 the contact means is pressed against the transfer means while the test pattern toner image on the transfer means moves from the transfer position to the detecting position, and the contact means is prevented from being pressed against the transfer means to prevent the test pattern toner image from being transferred from the transfer means onto the contact means when the test pattern toner image on the transfer means passes the pressing position after passing the detecting position.

* * * * *